Figure 7:
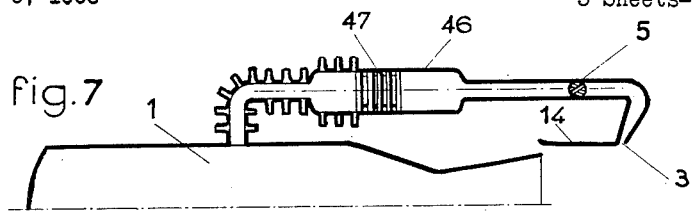

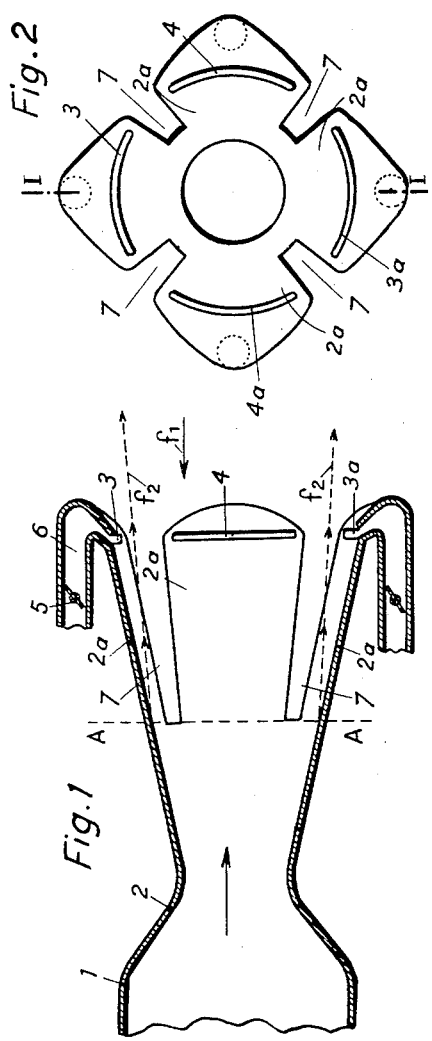

Dec. 4, 1962    J. H. BERTIN ET AL    3,066,485
STEERING DEVICE FOR ROCKET-PROPELLED VEHICLES
Filed Dec. 5, 1958    3 Sheets-Sheet 2
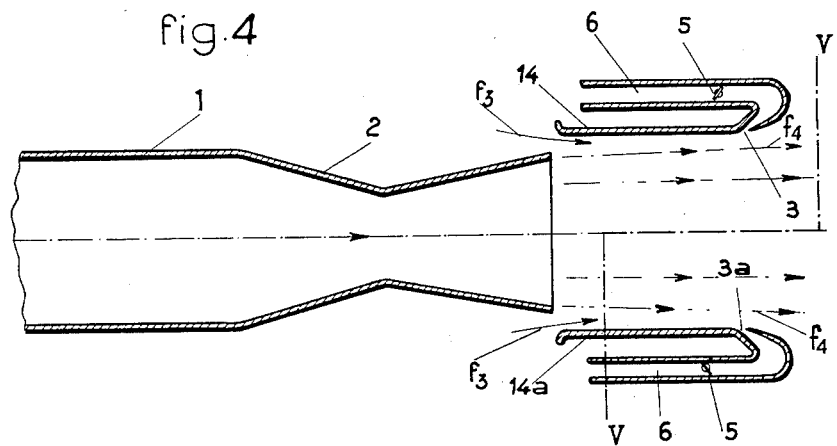
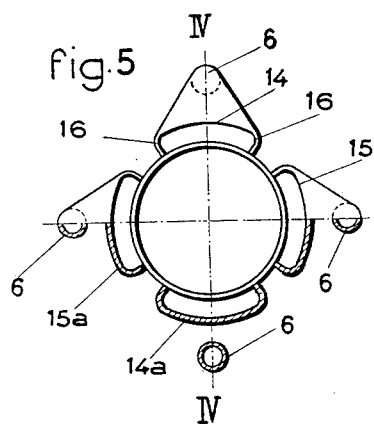
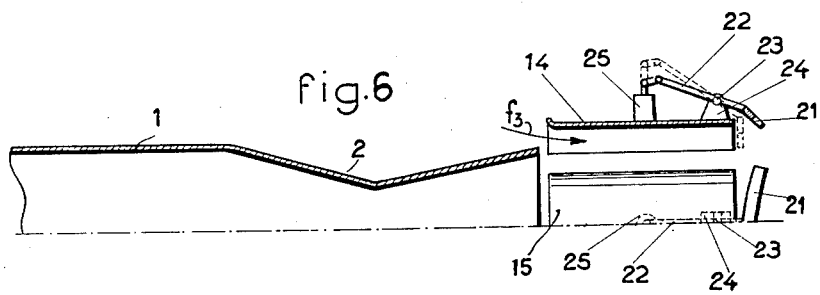

Dec. 4, 1962  J. H. BERTIN ET AL  3,066,485
STEERING DEVICE FOR ROCKET-PROPELLED VEHICLES
Filed Dec. 5, 1958  3 Sheets-Sheet 3

United States Patent Office 3,066,485
Patented Dec. 4, 1962

3,066,485
STEERING DEVICE FOR ROCKET-PROPELLED VEHICLES
Jean Henri Bertin, Neuilly-sur-Seine, and Marcel Kadosch and Louis Duthion, Paris, France, assignors to Societe Bertin & Cie, Paris, France, a French company
Filed Dec. 5, 1958, Ser. No. 778,382
Claims priority, application France Dec. 11, 1957
10 Claims. (Cl. 60—35.54)

There has already been proposed apparatus enabling unsymmetrical deviation of the jet escaping from a reaction motor, with a view to creating variable components of the power oriented perpendicularly to the axis of the orifice of the reactant, and in consequence couples usable in controlling the propelled vehicle.

In the case of rockets, the problem of deviation of the jet imposes conditions of considerable severity by reason of the strongly supersonic character of the jet and also of its great energy, and in particular of its high temperature.

The apparatus which forms the subject of the invention enables this problem to be solved.

According to the present invention the divergent portion of the orifice of the rocket is prolonged down-stream of the transverse plane where the expansion is normally terminated, so that, the jet separating from the prolonged divergent portion after passing this plane, it becomes possible, by placing auxiliary blowing nozzles or solid obstructions down-stream of the said plane, to deviate the jet without diminishing its section of escape and without disturbing the adjustment of the orifice.

Preferably, the part of the prolongation of the divergent portion which carries the auxiliary nozzles or the movable screens or solid obstructions, is arranged in such a way as to present an interruption of the conical surface of the divergent portion, whereby the jet has not the tendency of itself to come to cling to one zone or another of the prolongation under the effect of the depression which it tends to produce around it in the prolongation. This brings about in effect an instability in the direction of escape of the jet.

This interruption of the conical surface may consist of holes for the access of the exterior air, or of slots arranged in the prolongation, which may then present the same general conical form as the divergent portion. It may also result from the employment, in order to form the prolongation, of a surface having a greater diameter than the divergent portion at its junction therewith. This surface may, for example, be cylindrical.

This interruption may also take the form, at the base of the prolongation, of an aperture open to the ambient atmosphere, so that the jet of gas issuing from the rocket induces a current of air between it and the internal wall of the prolongation.

By locally arresting this induced current of air at its exit by means of vents or nozzles adapted to direct an auxiliary fluid towards the jet and thus to exert thereon deviating impulse, or further by means of movable screens or solid obstructions, the static pressure is increased in the zone where the induced current is blocked, and thus a deviating action is exerted on the jet. In the case of solid obstructions the advantage is obtained that the said obstructions do not need to penetrate into the jet, and that they are therefore not subjected to the destructive action thereof.

The description which follows, referring to the accompanying drawings, will make clear the different features of the invention and the manner of their realisation, it being understood that any arrangement arising, whether from the text or from the figures, falls within the scope of the present invention.

FIGURE 1 shows a first embodiment of the invention in section along a plane containing the axis of the orifice, FIGURE 2 is an end view seen in the direction of the arrow $f_1$ on FIGURE 1, FIGURE 3 shows a second embodiment of the invention in partial axial section, FIGURE 4 is an axial section of a third embodiment of the invention, FIGURE 5 is a transverse section along the chain dotted line V—V in FIGURE 4, FIGURE 6 is an axial section of a fourth embodiment with a solid obstruction, FIGURES 7–11 are schematic views illustrating divers means of engendering the blowing fluid.

In the embodiment of FIGURES 1 and 2, the surface of the divergent portion of the orifice 2 is prolonged down-stream of the transverse plane A—A where the gases emerge from the combustion chamber 1 of the rocket, having terminated their expansion (to a pressure determined by the exterior atmosphere), and where in consequence the formed jet separates from the wall of the divergent portion, the limits of this jet being shown by the dotted lines $f_2$ furnished with arrows. The prolongation 2a, which presents the same conical surface as the effective part of the divergent portion situated up-stream of the plane A—A, is open to the atmosphere on its lateral wall along the slots 7, which thus divide from one another tongue-like members in number equal to that of the blowing nozzles or the movable obstructions or screens. A blowing nozzle, supplied with auxiliary fluid under a convenient pressure by a conduit 6 with a throttle 5, is arranged at the extremity of each tongue. In the example shown there are four tongues and four nozzles, 3, 3a, 4, 4a, opposed two by two. These nozzles are preferably inclined towards the up-stream side of the flow which passes through the orifice in such a manner that the flat auxiliary jets which emerge from these nozzles, when they are supplied with auxiliary fluid under convenient pressure, have not only a component of velocity normal to the velocity of the principal flow, but also a component in the direction opposite to that velocity. It is sufficient to open the throttle 5 of the conduit 6 which connects one of the slits, the slit 3 for example, to the source of auxiliary fluid, in order for the flat jet then issuing from this slit to deviate the jet of the rocket to the side opposite to the slit 3 thus fed, creating a component of force normal to the axis and directed in the direction opposite to the deviation of the jet. According to whether one or other of the throttles 5 is opened, or equally the two throttles corresponding to two successive slits, it is possible to vary the direction of this normal component, which may be utilised to control the propelled machine, since it creates a couple of which the value depends on the position of the centre of gravity which is situated towards the left of FIGURE 1. As the nozzles are downstream of the plane A—A where the jet separates, it will be understood that the adjustment of the orifice is not disturbed when one sets one of the blowers in action, since the jet, deviated opposite to the nozzle set in action, finds a sufficient section of passage, and that, moreover, introductions of exterior air, which are possible across the slots, hinder the jet from coming to cling against one or other of the tongues, in the absence of any provoked deviation.

The slots, which in the example shown are delimited by the generators of the conical surface, may be replaced by openings of another form, or even by a series of holes.

In the second embodiment, shown in FIGURE 3, the divergent portion is prolonged by a surface 9 fixed on the divergent portion and forming at its junction therewith forming an enlargement 9a in such a manner that the jet, of which the boundary is at $f_2$, is situated at a certain distance from the internal surface of the prolongation 9 and cannot cling to the prolongation by reason of the difference of curvature which it presents in comparison with the divergent portion. The diameter of the free opening of the prolongation is, moreover, sufficient for the jet, during a period of deviation under the action of a blast, to find a sufficient free section. In the example of the drawing, the prolongation 9 has a general cylindrical form, but it could also be conical or of other form. It carries near its free opening the blowing nozzles 3, 3a, 4 and 4a arranged as in the case of FIGURES 1 and 2. As above, the holes for the access of exterior air may be provided on the said prolongation, for example, in the region of the enlargement 9a.

In the third embodiment represented by FIGURES 4 and 5, down-stream of the exit from the orifice, and encircling the jets of which the boundary is shown by $f_4$, are disposed four elements of cylindrical surface 14, 14a, 15 and 15a, identical among themselves and opposed two by two. There is a certain gap left between these elements and the boundary of the jet. They are open to free air up and downstream and are bounded by borders 16 situated in radial planes. Each of them thus forms, at the exterior of the jet, a channel in which the induction produced by the jet determines an intake of exterior air according to the arrows $f_3$. At its down-stream extremity, each element carries a blowing vent opening on the internal wall of the element in a nozzle 3 in the form of an arc of a circle, disposed as said above and fed by a conduit 6 with a throttle 5. The divers throttles can be actuated by the control mechanism of the rocket, or remotely controlled, in order to feed selectively one or more of the slits 3.

When all the throttles are closed, the conditions are perfectly symmetrical all round the axis of the jet, and the jet flows axially.

If one of the throttles is opened, for example that represented at the top of FIGURE 4, the fluid jet escaping from the corresponding slit 3 makes an obstruction to the flow of the air induced between the upper surface element 14 and the jet. The static pressure thus becomes increased in the gap between the jet and this surface element. A force normal to the axis of the system and directed upwardly is thus created on the upper surface element 14. If the throttle corresponding to the opposed surface element 14a is opened, there is naturally obtained a controlling force in the reverse direction to the preceding, and so forth.

Alternatively, a number other than four of the elements of symmetrical surface could be used.

The embodiment of FIGURE 6 differs from the preceding in that the arrest of the induced current of air in one or other of the elements 14, 14a, 15 and 15a is obtained by solid obstructions. Each of these obstructions consists of a portion of flat ring 21, carried by a lever 22. This lever is pivoted at 23 on a bracket 24 fixed to the exterior of the corresponding surface element. A small jack 25 operates on the tail of each lever 22 in order to place the obstruction 21 which it carries either in the retracted position represented by full lines in FIGURE 6, in which the obstruction allows the induced current of air to pass freely, or in the working position represented by dotted lines. It should be noted that these solid obstructions operate only on the induced current of air, and are not submitted to the destructive action of the jet.

The jets of auxiliary blowing used in the embodiments of FIGURES 1-5 may be obtained in divers ways. In the case of FIGURE 7, the jets are formed by a fluid in the liquid state, by water for example, stored in a reservoir 46 which is associated with each slit 3. This liquid is submitted permanently to the pressure of gas in the combustion chamber 1 of the rocket, which acts on the piston 47 so that the throttle 5 associated with the slit 3 has only to be opened to obtain through this slit a jet of liquid producing the action described—for example, arresting the induced current of air as has been said.

Figure 8:
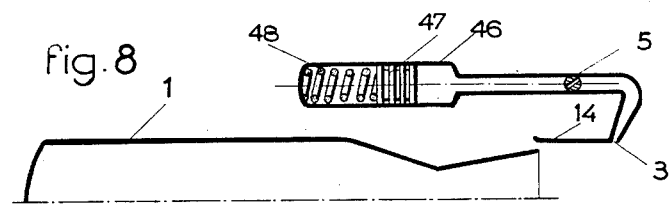
Figure 9:
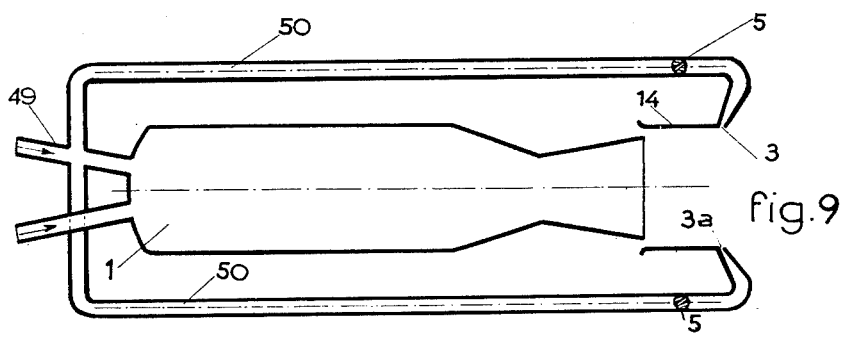

In the variant of FIGURE 8, the pressure on the liquid or gas contained in the reservoir 46 is exerted by a piston 47 submitted to the action of a compression spring 48. It is also possible, as shown in FIGURE 9, to use one of the liquids feeding the combustion chamber of the rocket in order to form the fluid obstruction. For each slit 3, the liquid is abstracted from one of the conduits 49 feeding the combustion chamber by means of a conduit 50 provided with the throttle 5.

Figure 10:
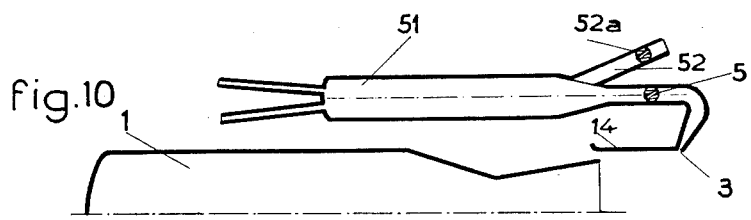

FIGURE 10 shows a variant in which the blowing gas for each slit is engendered in an auxiliary combustion chamber 51 which is supplied with a hypergolic mixture containing a large excess of one of the two reactants, the supporter of combustion for preference, or provided with a cooling fluid such as water, in such a manner that the temperature engendered is moderated (a few hundred degrees). The resulting gases escape through a vent 52 when they are not in use in blowing. This vent is furnished with a valve 52a, ganged with the throttle 5 associated with the blowing slit, in such a way as to be closed when the throttle 5 is open and vice versa.

The combustion chamber 51 may be that of a rocket intended to drive auxiliary mechanism by means of a gas turbine, in which case the valve 52a is eliminated, the vent 52 leading to the turbine.

Figure 11:
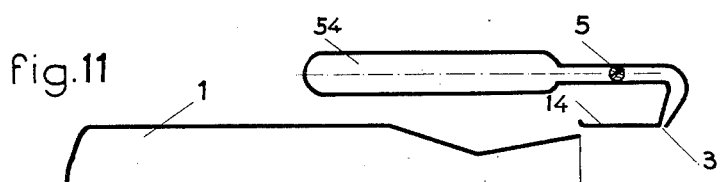

In the case of FIGURE 11 the blowing fluid is a gas stored under pressure, if necessary in the liquid state, in a reservoir 54.

We claim:

1. A device for steering a body propelled by a rocket motor having a convergent-divergent nozzle formed with an outlet section, said nozzle expanding combustion gases generated in the rocket motor and forming a thrust-providing jet issuing from the outlet section of said nozzle, said device comprising a fixed annular wall extending downstream of the nozzle outlet section and bounding a space adjacent said outlet section, at least the downstream terminal portion of said wall being at a distance from the axis of the nozzle substantially greater than the periphery of the outlet section thereof, air passage means connecting the space bounded by said wall with the ambient medium, whereby air is inducted into the space bounded by said wall to form an annular sheath of air around the rocket exhaust gases, and a plurality of controllable means positioned adjacent said terminal portion, said controllable means being peripherally-spaced and distributed around said axis for selectively forming obstacles in the path of the air stream flowing along said wall, thereby deflecting said air stream, and consequently, said combustion gases in the transverse direction opposite to said obstacles.

2. A device as defined in claim 1, wherein the wall forms a discontinuous extension of the nozzle, the discontinuity being such that the jet issuing from said nozzle separates from the wall at the outlet section of said nozzle.

3. A device as defined in claim 2, wherein the discontinuity comprises an air passage exposing the outlet section of the nozzle to ambient pressure.

4. A device as defined in claim 3, wherein the wall has an upstream terminal portion adjacent the outlet section of the nozzle and at a distance from the axis thereof substantially greater than the periphery of said outlet section, whereby a peripheral gap is formed between said section and said upstream terminal section.

5. A device as defined in claim 4, wherein the wall forms part of a cylinder coaxial with the nozzle, the latter ending with a circular outlet section, having a radius substantially smaller than that of said cylinder.

6. A device as defined in claim 5, wherein the wall comprises four arcuate segments distributed uniformly about the axis circumferentially spaced from each other by 90°, each segment carrying at its downstream terminal portion thereof a controllable obstacle-forming means.

7. A device as defined in claim 3, wherein the wall forms a smooth extension of the divergent of the nozzle, said wall being formed with orifices adjacent the outlet section of said nozzle.

8. A device as defined in claim 7, wherein said wall is of conical form and the wall forms part of a cone extending the divergent of the nozzle.

9. A device as defined in claim 8, wherein the wall comprises four conical segments distributed uniformly about the axis and circumferentially spaced from each other by 90°, each segment carrying at its upstream terminal portion a controllable obstacle-forming means.

10. A device as defined in claim 2, wherein the nozzle has the form of a body of revolutionary shape and ends with a circular outlet section, wherein the wall is cylindrical and coaxial with said nozzle, with the radius of said cylindrical wall being substantially greater than that of said circular outlet section, said wall being joined to said nozzle near the periphery of said outlet section through a surface discontinuity.

References Cited in the file of this patent

UNITED STATES PATENTS

| | | |
|---|---|---|
| 916,726 | Lake | Mar. 30, 1909 |
| 2,611,239 | Briggs | Sept. 23, 1952 |
| 2,654,552 | Jonas | Oct. 6, 1953 |
| 2,683,415 | Wilson | July 13, 1954 |
| 2,694,898 | Stauff | Nov. 23, 1954 |
| 2,726,510 | Goddard | Dec. 13, 1955 |
| 2,728,191 | Casey | Dec. 27, 1955 |
| 2,780,059 | Fiedler | Feb. 5, 1957 |
| 2,793,493 | Kadosch et al. | May 28, 1957 |
| 2,799,990 | Hausmann | July 23, 1957 |
| 2,846,164 | Haberkorn | Aug. 5, 1958 |
| 2,846,844 | O'Rourke | Aug. 12, 1958 |
| 2,872,782 | Johnson et al. | Feb. 10, 1959 |
| 2,875,578 | Kadosch et al. | Mar. 3, 1959 |

FOREIGN PATENTS

| | | |
|---|---|---|
| 879,835 | France | Dec. 10, 1942 |
| 1,050,948 | France | Sept. 9, 1953 |
| 1,057,271 | France | Oct. 28, 1953 |
| 1,124,348 | France | June 25, 1956 |
| 68,464 | France (Addition) | Nov. 12, 1957 |
| 1,155,534 | France | Dec. 2, 1957 |